(12) United States Patent
Ackley

(10) Patent No.: US 10,584,962 B2
(45) Date of Patent: Mar. 10, 2020

(54) SYSTEM AND METHOD FOR VALIDATING PHYSICAL-ITEM SECURITY

(71) Applicant: Hand Held Products, Inc., Fort Mill, SC (US)

(72) Inventor: H. Sprague Ackley, Seattle, WA (US)

(73) Assignee: Hand Held Products, Inc, Fort Mill, SC (US)

(*) Notice: Subject to any disclaimer, the term of this patent is extended or adjusted under 35 U.S.C. 154(b) by 24 days.

(21) Appl. No.: 15/967,946

(22) Filed: May 1, 2018

(65) Prior Publication Data

US 2019/0339070 A1   Nov. 7, 2019

(51) Int. Cl.
| | | |
|---|---|---|
| *G01B 11/25* | (2006.01) | |
| *G01B 11/245* | (2006.01) | |
| *B64F 1/32* | (2006.01) | |
| *B65G 67/00* | (2006.01) | |

(52) U.S. Cl.
CPC .............. *G01B 11/25* (2013.01); *B64F 1/32* (2013.01); *B65G 67/00* (2013.01); *G01B 11/245* (2013.01); *B65G 2203/0208* (2013.01); *B65G 2203/041* (2013.01)

(58) Field of Classification Search
CPC combination set(s) only.
See application file for complete search history.

(56) References Cited

U.S. PATENT DOCUMENTS

| | | |
|---|---|---|
| 3,971,065 A | 7/1976 | Bayer |
| 4,026,031 A | 5/1977 | Siddall et al. |
| 4,137,567 A | 1/1979 | Grube |
| 4,279,328 A | 7/1981 | Ahlbom |
| 4,398,811 A | 8/1983 | Nishioka et al. |
| 4,495,559 A | 1/1985 | Gelatt, Jr. |

(Continued)

FOREIGN PATENT DOCUMENTS

| | | |
|---|---|---|
| AU | 2004212587 A1 | 4/2005 |
| CN | 201139117 Y | 10/2008 |

(Continued)

OTHER PUBLICATIONS

European Extended Search Report in related EP Application No. 16190017.0, dated Jan. 4, 2017, 6 pages.

(Continued)

*Primary Examiner* — Kyle O Logan
(74) *Attorney, Agent, or Firm* — Alston & Bird LLP

(57) ABSTRACT

Validating security may include obtaining, by first computerized equipment in a first area, data indicative of a measurement of a characteristic of a physical item in the first area; obtaining, by second computerized equipment in a second area, data indicative of a measurement of the characteristic of a physical item in the second area, and data indicative of a unique identifier of the physical item in the second area; retrieving, by a processor, using the unique identifier, the measurement of the characteristic of the physical item in the first area; determining, by the processor, a difference between the measurement of the characteristic of the physical item in the first area and the measurement of the characteristic of the physical item in the second area; and providing, by the processor, if indicated by a comparison, an indication of invalid security for the physical item in the second area.

20 Claims, 4 Drawing Sheets

(56) References Cited

U.S. PATENT DOCUMENTS

| | | |
|---|---|---|
| 4,634,278 A | 1/1987 | Ross et al. |
| 4,730,190 A | 3/1988 | Win et al. |
| 4,803,639 A | 2/1989 | Steele et al. |
| 4,914,460 A | 4/1990 | Caimi et al. |
| 4,974,919 A | 12/1990 | Muraki et al. |
| 5,111,325 A | 5/1992 | DeJager |
| 5,175,601 A | 12/1992 | Fitts |
| 5,184,733 A | 2/1993 | Amarson et al. |
| 5,198,648 A | 3/1993 | Hibbard |
| 5,220,536 A | 6/1993 | Stringer et al. |
| 5,243,619 A | 9/1993 | Albers et al. |
| 5,331,118 A | 7/1994 | Jensen |
| 5,359,185 A | 10/1994 | Hanson |
| 5,384,901 A | 1/1995 | Glassner et al. |
| 5,477,622 A | 12/1995 | Skalnik |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,592,333 A | 1/1997 | Lewis |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,802,092 A | 9/1998 | Endriz |
| 5,808,657 A | 9/1998 | Kurtz et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 12/2003 | Stern |
| 6,674,904 B1 | 1/2004 | McQueen |
| 6,705,526 B1 | 3/2004 | Zhu et al. |
| 6,773,142 B2 | 8/2004 | Rekow |
| 6,781,621 B1 | 8/2004 | Gobush et al. |
| 6,804,269 B2 | 10/2004 | Lizotte et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,912,293 B1 | 6/2005 | Korobkin |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,210,894 B2 | 5/2007 | Huang et al. |
| 7,214,954 B2 | 5/2007 | Schopp |
| 7,233,682 B2 | 6/2007 | Levine |
| 7,277,187 B2 | 10/2007 | Smith et al. |
| 7,307,653 B2 | 12/2007 | Dutta |
| 7,310,431 B2 | 12/2007 | Gokturk et al. |
| 7,313,264 B2 | 12/2007 | Crampton |
| 7,353,137 B2 | 4/2008 | Vock et al. |
| 7,413,127 B2 | 8/2008 | Ehrhart et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,206 B2 | 6/2010 | Terrafranca, Jr. et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,912,320 B1 | 3/2011 | Minor |
| 7,974,025 B2 | 7/2011 | Topliss |
| 8,009,358 B2 | 8/2011 | Zalevsky et al. |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,158 B2 | 7/2012 | Wiest |
| 8,212,889 B2 | 7/2012 | Chanas et al. |
| 8,224,133 B2 | 7/2012 | Popovich et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,301,027 B2 | 10/2012 | Shaw et al. |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,320,621 B2 | 11/2012 | McEldowney |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |
| 8,368,762 B1 | 2/2013 | Chen et al. |
| 8,371,507 B2 | 2/2013 | Haggerty et al. |
| 8,374,498 B2 | 2/2013 | Pastore |
| 8,376,233 B2 | 2/2013 | Van Horn et al. |
| 8,381,976 B2 | 2/2013 | Mohideen et al. |
| 8,381,979 B2 | 2/2013 | Franz |

(56) References Cited

U.S. PATENT DOCUMENTS

| | | |
|---|---|---|
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,441,749 B2 | 5/2013 | Brown et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,594,425 B2 | 11/2013 | Gurman et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,806 B2 | 9/2014 | Cockerell et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,277 B2 | 12/2014 | Pesach et al. |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |

(56) References Cited

U.S. PATENT DOCUMENTS

| | | |
|---|---|---|
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,993,974 B2 | 3/2015 | Goodwin |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,066,087 B2 | 6/2015 | Shpunt |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,195 B2 | 7/2015 | Holeva et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,142,035 B1 | 9/2015 | Rotman et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,278 B1 | 10/2015 | Kong et al. |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,233,470 B1 | 1/2016 | Bradski et al. |
| 9,235,553 B2 | 1/2016 | Fitch et al. |
| 9,235,899 B1 | 1/2016 | Kirmani et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,273,846 B1 | 3/2016 | Rossi et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,299,013 B1 | 3/2016 | Curlander et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,366,861 B1 | 6/2016 | Johnson |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B2 | 7/2016 | Todeschini |
| 9,399,557 B1 | 7/2016 | Mishra et al. |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |

(56) References Cited

U.S. PATENT DOCUMENTS

| | | |
|---|---|---|
| 9,424,749 B1 | 8/2016 | Reed et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,470,511 B2 | 10/2016 | Maynard et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,486,921 B1 | 11/2016 | Straszheim et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,595,038 B1 | 3/2017 | Cavalcanti et al. |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,709,387 B2 | 7/2017 | Fujita et al. |
| 9,736,459 B2 | 8/2017 | Mor et al. |
| 9,741,136 B2 | 8/2017 | Holz |
| 9,828,223 B2 | 11/2017 | Svensson et al. |
| 2001/0027995 A1 | 10/2001 | Patel et al. |
| 2001/0032879 A1 | 10/2001 | He et al. |
| 2002/0036765 A1 | 3/2002 | McCaffrey |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0186897 A1 | 12/2002 | Kim et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0163287 A1 | 8/2003 | Vock et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0187887 A1 | 8/2005 | Nicolas et al. |
| 2005/0211782 A1 | 9/2005 | Martin |
| 2005/0240317 A1 | 10/2005 | Kienzle-Lietl |
| 2005/0257748 A1 | 11/2005 | Kriesel et al. |
| 2005/0264867 A1 | 12/2005 | Cho et al. |
| 2006/0036556 A1 | 2/2006 | Knispel |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre |
| 2006/0269165 A1 | 11/2006 | Viswanathan |
| 2006/0276709 A1 | 12/2006 | Khamene et al. |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0165013 A1 | 7/2007 | Goulanian et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0054062 A1 | 3/2008 | Gunning et al. |
| 2008/0056536 A1 | 3/2008 | Hildreth et al. |
| 2008/0062164 A1 | 3/2008 | Bassi et al. |
| 2008/0065509 A1 | 3/2008 | Williams |
| 2008/0077265 A1 | 3/2008 | Boyden |
| 2008/0079955 A1 | 4/2008 | Storm |
| 2008/0156619 A1 | 7/2008 | Patel et al. |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0038182 A1 | 2/2009 | Lans et al. |
| 2009/0046296 A1 | 2/2009 | Kilpartrick et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0114818 A1 | 5/2009 | Casares et al. |
| 2009/0134221 A1 | 5/2009 | Zhu et al. |
| 2009/0161090 A1 | 6/2009 | Campbell et al. |

(56) References Cited

U.S. PATENT DOCUMENTS

| | | |
|---|---|---|
| 2009/0189858 A1 | 7/2009 | Lev et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0194709 A1 | 8/2010 | Tamaki et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Amz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0075936 A1 | 3/2011 | Deaver |
| 2011/0081044 A1 | 4/2011 | Peeper |
| 2011/0099474 A1 | 4/2011 | Grossman et al. |
| 2011/0169999 A1 | 7/2011 | Grunow et al. |
| 2011/0180695 A1 | 7/2011 | Li et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0243432 A1 | 10/2011 | Hirsch et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2011/0310256 A1 | 12/2011 | Shishido |
| 2012/0014572 A1 | 1/2012 | Wong et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0082383 A1 | 4/2012 | Kruglick |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236212 A1 | 9/2012 | Itoh et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294478 A1 | 11/2012 | Publicover et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0314258 A1 | 12/2012 | Moriya |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0076857 A1 | 3/2013 | Kurashige et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0317642 A1 | 11/2013 | Asada |
| 2013/0326425 A1 | 12/2013 | Forstall et al. |
| 2013/0329012 A1 | 12/2013 | Bartos |
| 2013/0329013 A1 | 12/2013 | Metois et al. |
| 2013/0332524 A1 | 12/2013 | Fiala et al. |
| 2013/0342343 A1 | 12/2013 | Harring et al. |
| 2014/0001258 A1 | 1/2014 | Chan et al. |

(56) References Cited

U.S. PATENT DOCUMENTS

| | | |
|---|---|---|
| 2014/0001267 A1 | 1/2014 | Giordano et al. |
| 2014/0002828 A1 | 1/2014 | Laffargue et al. |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0039674 A1 | 2/2014 | Motoyama et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Nang |
| 2014/0076974 A1 | 3/2014 | Havens et al. |
| 2014/0078342 A1 | 3/2014 | Li et al. |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0097252 A1 | 4/2014 | He et al. |
| 2014/0098091 A1 | 4/2014 | Hori |
| 2014/0098243 A1 | 4/2014 | Ghazizadeh |
| 2014/0098244 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104664 A1 | 4/2014 | Lee |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125577 A1 | 5/2014 | Hoang et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0142398 A1 | 5/2014 | Patil et al. |
| 2014/0152882 A1 | 6/2014 | Samek et al. |
| 2014/0152975 A1 | 6/2014 | Ko |
| 2014/0157861 A1 | 6/2014 | Jonas et al. |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0177931 A1 | 6/2014 | Kocherscheidt et al. |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0320605 A1 | 10/2014 | Johnson |
| 2014/0333775 A1 | 11/2014 | Naikal et al. |
| 2014/0347533 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0014416 A1 | 1/2015 | Kotlarsky et al. |
| 2015/0016712 A1 | 1/2015 | Rhoads et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062160 A1 | 3/2015 | Sakamoto et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0070158 A1 | 3/2015 | Hayasaka |
| 2015/0070489 A1 | 3/2015 | Hudman et al. |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0116498 A1 | 4/2015 | Vartiainen et al. |
| 2015/0117749 A1 | 4/2015 | Chen et al. |
| 2015/0127791 A1 | 5/2015 | Kosecki et al. |
| 2015/0128116 A1 | 5/2015 | Chen et al. |
| 2015/0130928 A1 | 5/2015 | Maynard et al. |
| 2015/0133047 A1 | 5/2015 | Smith et al. |
| 2015/0134470 A1 | 5/2015 | Hejl et al. |

(56) References Cited

U.S. PATENT DOCUMENTS

| | | |
|---|---|---|
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0163474 A1 | 6/2015 | You |
| 2015/0178900 A1 | 6/2015 | Kim et al. |
| 2015/0182844 A1 | 7/2015 | Jang |
| 2015/0186703 A1 | 7/2015 | Chen et al. |
| 2015/0199957 A1 | 7/2015 | Funyak et al. |
| 2015/0204662 A1 | 7/2015 | Kobayashi et al. |
| 2015/0210199 A1 | 7/2015 | Payne |
| 2015/0213590 A1 | 7/2015 | Brown et al. |
| 2015/0213647 A1 | 7/2015 | Laffargue et al. |
| 2015/0219748 A1 | 8/2015 | Hyatt |
| 2015/0220753 A1 | 8/2015 | Zhu et al. |
| 2015/0229838 A1 | 8/2015 | Hakim et al. |
| 2015/0243030 A1 | 8/2015 | Pfeiffer |
| 2015/0248578 A1 | 9/2015 | Utsumi |
| 2015/0253469 A1 | 9/2015 | Le Gros et al. |
| 2015/0254485 A1 | 9/2015 | Feng et al. |
| 2015/0260830 A1 | 9/2015 | Ghosh et al. |
| 2015/0269403 A1 | 9/2015 | Lei et al. |
| 2015/0201181 A1 | 10/2015 | Herschbach |
| 2015/0276379 A1 | 10/2015 | Ni et al. |
| 2015/0308816 A1 | 10/2015 | Laffargue et al. |
| 2015/0310243 A1 | 10/2015 | Ackley |
| 2015/0310389 A1 | 10/2015 | Crimm et al. |
| 2015/0316368 A1 | 11/2015 | Moench et al. |
| 2015/0325036 A1 | 11/2015 | Lee |
| 2015/0327012 A1 | 11/2015 | Bian et al. |
| 2015/0332075 A1 | 11/2015 | Burch |
| 2015/0332463 A1 | 11/2015 | Galera et al. |
| 2015/0355470 A1 | 12/2015 | Herschbach |
| 2016/0014251 A1 | 1/2016 | Hejl |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0070982 A1 | 2/2016 | Li et al. |
| 2016/0062473 A1 | 3/2016 | Bouchat et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0092805 A1 | 3/2016 | Geisler et al. |
| 2016/0094016 A1 | 3/2016 | Beach et al. |
| 2016/0101936 A1* | 4/2016 | Chamberlin ......... G05B 19/402 700/402 |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0117631 A1 | 4/2016 | McCloskey et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0147408 A1 | 5/2016 | Bevis et al. |
| 2016/0164261 A1 | 6/2016 | Warren |
| 2016/0169665 A1 | 6/2016 | Deschenes et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0178915 A1 | 6/2016 | Mor et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0191801 A1 | 6/2016 | Sivan |
| 2016/0192051 A1 | 6/2016 | DiPiazza et al. |
| 2016/0125873 A1 | 7/2016 | Braho et al. |
| 2016/0202478 A1 | 7/2016 | Masson et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203641 A1 | 7/2016 | Bostick et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0210780 A1 | 7/2016 | Paulovich et al. |
| 2016/0316190 A1 | 7/2016 | McCloskey et al. |
| 2016/0223474 A1 | 8/2016 | Tang et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0328854 A1 | 11/2016 | Kimura |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |

(56) References Cited

U.S. PATENT DOCUMENTS

| | | |
|---|---|---|
| 2016/0377414 A1 | 12/2016 | Thuries et al. |
| 2016/0377417 A1 | 12/2016 | Jovanovski et al. |
| 2017/0008644 A1 | 1/2017 | Dinkelmann et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0103545 A1 | 4/2017 | Holz |
| 2017/0108838 A1 | 4/2017 | Todeschinie et al. |
| 2017/0108895 A1 | 4/2017 | Chamberlin et al. |
| 2017/0115490 A1 | 4/2017 | Hsieh et al. |
| 2017/0115497 A1 | 4/2017 | Chen et al. |
| 2017/0116462 A1 | 4/2017 | Ogasawara |
| 2017/0118355 A1 | 4/2017 | Wong et al. |
| 2017/0121158 A1 | 5/2017 | Wong |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0132806 A1 | 5/2017 | Balachandreswaran |
| 2017/0139012 A1 | 5/2017 | Smith |
| 2017/0139213 A1 | 5/2017 | Schmidtlin |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0148250 A1 | 5/2017 | Angermayer |
| 2017/0150124 A1 | 5/2017 | Thuries |
| 2017/0018294 A1 | 6/2017 | Hardy et al. |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |
| 2017/0200296 A1 | 7/2017 | Jones et al. |
| 2017/0309108 A1 | 10/2017 | Sadovsky et al. |
| 2017/0336870 A1 | 11/2017 | Everett et al. |
| 2018/0018627 A1* | 1/2018 | Ross ............... G06Q 10/0833 |

FOREIGN PATENT DOCUMENTS

| | | | |
|---|---|---|---|
| DE | 3335760 | A1 | 4/1985 |
| DE | 10210813 | A1 | 10/2003 |
| DE | 102007037282 | A1 | 3/2008 |
| EP | 1111435 | A2 | 6/2001 |
| EP | 1443312 | A1 | 8/2004 |
| EP | 1112483 | B1 | 5/2006 |
| EP | 1232480 | B1 | 5/2006 |
| EP | 2013117 | A1 | 1/2009 |
| EP | 2216634 | A1 | 8/2010 |
| EP | 2286932 | A2 | 2/2011 |
| EP | 2372648 | A2 | 10/2011 |
| EP | 2381421 | A2 | 10/2011 |
| EP | 2533009 | A1 | 12/2012 |
| EP | 2562715 | A1 | 2/2013 |
| EP | 2722656 | A1 | 4/2014 |
| EP | 2779027 | A1 | 9/2014 |
| EP | 2833323 | A2 | 2/2015 |
| EP | 2843590 | A2 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| EP | 3270342 | A1 | 1/2018 |
| GB | 2503978 | A1 | 1/2014 |
| GB | 2525053 | A | 10/2015 |
| GB | 2531928 | A | 5/2016 |
| JP | H04129902 | A | 4/1992 |
| JP | 200696457 | A | 4/2006 |
| JP | 2007084162 | A | 4/2007 |
| JP | 2008210276 | A | 9/2008 |
| JP | 2014210646 | A | 11/2014 |
| JP | 2015174705 | A | 10/2015 |
| KR | 20100020115 | A | 2/2010 |
| KR | 20110013200 | A | 2/2011 |
| KR | 20110117020 | A | 10/2011 |
| KR | 20120028109 | A | 3/2012 |
| WO | 96/40452 | A1 | 12/1996 |
| WO | 0077726 | A1 | 12/2000 |
| WO | 0114836 | A1 | 3/2001 |
| WO | 2006095110 | A1 | 9/2006 |
| WO | 2007015059 | A1 | 2/2007 |
| WO | 200712554 | A1 | 11/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 20130184340 | A1 | 12/2013 |
| WO | 2014023697 | A1 | 2/2014 |
| WO | 2014102341 | A1 | 7/2014 |
| WO | 2014149702 | A1 | 9/2014 |
| WO | 2014151746 | A1 | 9/2014 |
| WO | 2015006865 | A1 | 1/2015 |
| WO | 2016020038 | A1 | 2/2016 |
| WO | 2016061699 | | 4/2016 |
| WO | 2016061699 | A1 | 4/2016 |
| WO | 2016085682 | A1 | 6/2016 |

OTHER PUBLICATIONS

European Extended Search Report in related EP Application No. 16173429.8, dated Dec. 1, 2016, 8 pages [US 2013/0038881 cited on separate IDS filed concurrently herewith].

Extended European Search Report in related EP Application No. 16175410.0, dated Dec. 13, 2016, 5 pages.

European extended search report in related EP Application 16190833.0, dated Mar. 9, 2017, 8 pages [US Publication 2014/0034731 cited on separate IDS filed concurrently herewith].

United Kingdom Combined Search and Examination Report in related Application No. GB1620676.5, dated Mar. 8, 2017, 6 pages [References cited on separate IDS filed concurrently herewith; WO2014/151746, WO2012/175731, US 2014/0313527, GB2503978].

European Exam Report in related , EP Application No. 16168216.6, dated Feb. 27, 2017, 5 pages, [cited on separate IDS filed concurrently herewith; WO2011/017241 and US 2014/0104413].

EP Search Report in related EP Application No. 17171844 dated Sep. 18, 2017.4 pages [Only new art cited herein; some art has been cited on separate IDS filed concurrently herewith}.

EP Extended Search Report in related EP Applicaton No. 17174843.7 dated Oct. 17, 2017, 5 pages {Only new art cited herein; some art has been cited on separate IDS filed concurrently herewith}.

(56) References Cited

OTHER PUBLICATIONS

UK Further Exam Report in related UK Application No. GB1517842.9, dated Sep. 1, 2017, 5 pages (only new art cited herein; some art cited on separate IDS filed concurrently herewith).
European Exam Report in related EP Application No. 15176943.7, dated Apr. 12, 2017, 6 pages [Art cited on separate IDS filed concurrently herewith].
European Exam Report in related EP Application No. 15188440.0, dated Apr. 21, 2017, 4 pages [Art has been cited on separate IDS filed concurrently herewith.].
European Examination report in related EP Application No. 14181437.6, dated Feb. 8, 2017, 5 pages [References cited on separate IDS filed concurrently herewith].
Chinese Notice of Reexamination in related Chinese Application 201520810313.3, dated Mar. 14, 2017, English Computer Translation provided, 7 pages [References cited on separate IDS filed concurrently herewith].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017; NPL 14].
European Exam Report in related EP Application No. 16152477.2, dated Jun. 20, 2017, 4 pages [References cited on separate IDS filed concurrently herewith].
European Exam Report in related EP Applciation 16172995.9, dated Jul. 6, 2017, 9 pages [References cited on separate IDS filed concurrently herewith].
United Kingdom Search Report in related Application No. GB1700338.5, dated Jun. 30, 2017, 5 pages.
European Search Report in related EP Application No. 17175357.7, dated Aug. 17, 2017, pp. 1-7 [Referencs cited on separate IDS filed concurrently herewith].
European extended Search Report in related Application No. 17207882.6 dated Apr. 26, 2018, 10 pages.
European Extended Search Report in related EP Application No. 17201794.9, dated Mar. 16, 2018, 10 pages [Only new art cited herein].
European Extended Search Report in related EP Application 17205030.4, dated Mar. 22, 2018, 8 pages.
European Exam Report in related EP Application 16172995.9, dated Mar. 15, 2018, 7 pages (Only new art cited herein).
United Kingdom Combined Search and Examination Report dated Mar. 21, 2018, 5 pages (Art has been previously cited).
Extended European Search report in related EP Application No. 17189496.7 dated Dec. 5, 2017; 9 pages.
Extended European Search report in related EP Application No. 17190323.0 dated Jan. 19, 2018; 6 pages [Only new art cited herein].
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
United Kingdom Further Examination Report in related GB Patent Application No. 1517842.9 dated Jul. 26, 2018; 5 pages [Cited art has been previously cited in this matter].
United Kingdom Further Examination Report in related GB Patent Application No. 1517112.7 dated Jul. 17, 2018; 4 pages [No art cited].
United Kingdom Further Examination Report in related GB Patent Application No. 1620676.5 dated Jul. 17, 2018; 4 pages [No art cited].
Peter Clarke, Actuator Developer Claims Anti-Shake Breakthrough for Smartphone Cams, Electronic Engineering Times, p. 24, May 16, 2011.
Spiller, Jonathan; Object Localization Using Deformable Templates, Master's Dissertation, University of the Witwatersrand, Johannesburg, South Africa, 2007; 74 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
European Search Report for application No. EP13186043 dated Feb. 26, 2014 (now EP2722656 (Apr. 23, 2014)); Total pp. 7.
International Search Report for PCT/US2013/039438 (WO2013166368), dated Oct. 1, 2013, 7 pages.
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
European Office Action for application EP 13186043, dated Jun. 12, 2014(now EP2722656 (Apr. 23, 2014)), Total of 6 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
U.S. Appl. No. 14/801,023, Tyler Doomenbal et al., filed Jul. 16, 2015, not published yet, Adjusting Dimensioning Results Using Augmented Reality, 39 pages.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X/96 1996 IEEE; 4 pages.
Salvi, Joaquim et al. "Pattern Codification Strategies in Structured Light Systems" published in Pattern Recognition; The Journal of the Pattern Recognition Society, Accepted Oct. 2, 2003; 23 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8- 14, 2001; pp. 394-399, XP010584149, ISBN: 978-0-7695-1272-3.
Second Chinese Office Action in related CN Application No. 201520810685.6, dated Mar. 22, 2016, 5 pages, no references.
European Search Report in related EP Application No. 15190315.0, dated Apr. 1, 2016, 7 pages.
Second Chinese Office Action in related CN Application No. 20152208105362.2, dated Mar. 22, 2016, 5 pages. English Translation provided [No references].

(56) References Cited

OTHER PUBLICATIONS

European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
U.S. Appl. No. 14/800,757 , Eric Todeschini, filed Jul. 16, 2015, not published yet, Dimensioning and Imaging Items, 80 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
Search Report and Opinion in related GB Application No. 1517112.7, dated Feb. 19, 2016, 6 Pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating a Volume Dimensioner; 63 pages.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG'10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
European Search Report for Related EP Application No. 15189214.8, dated Mar. 3, 2016, 9 pages.
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
Search Report and Opinion in Related EP Application 15176943.7, dated Jan. 8, 2016, 8 pages.
European Search Report for related EP Application No. 15188440.0, dated Mar. 8, 2016, 8 pages.
United Kingdom Search Report in related application GB1517842.9, dated Apr. 8, 2016, 8 pages.
Great Britain Search Report for related Application on. GB1517843.7, dated Feb. 23, 2016; 8 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related Ep Application No. 15190306.9, dated Sep. 9, 2016, 15 pages.
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1 -Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", Dated Feb. 2, 2009, 36 pages.
European Search Report for related EP Application No. 16152477.2, dated May 24, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
Houle et al., "Vehical Positioning and Object Avoidance", U.S. Appl. No. 15/007,522 [not yet published], filed Jan. 27, 2016, 59 pages.
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
Combined Search and Examination Report in related UK Application No. GB1900752.5 dated Feb. 1, 2019, pp. 1-5.
Examination Report in related UK Application No. GB1517842.9 dated Mar. 8, 2019, pp. 1-4.
Examination Report in related EP Application No. 13193181.8 dated Mar. 20, 2019, pp. 1-4.
First Office Action in related CN Application No. 201510860188.1 dated Jan. 18, 2019, pp. 1-14 [All references previously cited.].
Examination Report in related EP Application No. 13785171.3 dated Apr. 2, 2019, pp. 1-5.
Lowe David G., "Filling Parameterized Three-Dimensional Models to Images", IEEE Transaction on Pattern Analysis and Machine Intelligence, IEEE Computer Society, USA, vol. 13, No. 5, May 1, 1991, pp. 441-450.
Padzensky, Ron; "Augmera; Gesture Control", Dated Apr. 18, 2015, 15 pages [Art in Office Action dated Jan. 20, 2017 in related Application.].
Grabowski, Ralph; "New Commands in AutoCADS 2010: Part 11 Smoothing 3D Mesh Objects" Dated 2011 (per examiner who cited reference), 6 pages, [Art in Office Action dated Jan. 20, 2017 in related Application.].

(56) References Cited

OTHER PUBLICATIONS

Theodoropoulos, Gabriel; "Using Gesture Recognizers to Handle Pinch, Rotate, Pan, Swipe, and Tap Gestures" dated Aug. 25, 2014, 34 pages, [Art in Office Action dated Oct. 20, 2017 in related Application.].

Boavida et al., "Dam monitoring using combined terrestrial imaging systems", 2009 Civil Engineering Survey Dec./Jan. 2009, pp. 33-38 {Cited in Notice of Allowance dated Sep. 15, 2017 in related matter}.

Ralph Grabowski, "Smothing 3D Mesh Objects," New Commands in AutoCAD 2010: Part 11, art in related matter Non Final Office Action dated May 19, 2017; 6 pages.

Wikipedia, "Microlens", Downloaded from https://en.wikipedia.org/wiki/Microlens, pp. 3. {Feb. 9, 2017 Final Office Action in related matter}.

Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 from http://iopscience.iop.org}.

Thorlabs, Advisory Action dated Apr. 12, 2017 in related commonly owned application, downloaded from https://www.thorlabs.com/newgrouppage9.cfm?objectgroup_id=6430, 4 pages.

Eksma Optics, Advisory Action dated Apr. 12, 2017 in related commonly owned application, downloaded from http://eksmaoptics.com/optical-systems/f-theta-lenses/f-theta-lens-for-1064-nm/, 2 pages.

Sill Optics, Advisory Action dated Apr. 12, 2017 in related commonly owned application, http://www.silloptics.de/1/products/sill-encyclopedia/laser-optics/f-theta-lenses/, 4 pages.

United Kingdom Further Exam Report in related application GB1607394.2 dated Oct. 5, 2018; 5 pages {Only new art cited here in].

European Extended Search Report in related EP application 18184864.9, dated Oct. 30, 2018, 7 pages.

Combined Search and Examination Report in related UK Application No. GB1817189.2 dated Nov. 14, 2018, pp. 1-4 [Reference previously cited].

Examination Report in related UK Application No. GB1517842.9 dated Dec. 21, 2018, pp. 1-7 [All references previously cited].

Examination Report in European Application No. 16152477.2 dated Jun. 18, 2019, pp. 1-6.

Examination Report in European Application No. 17175357.7 dated Jun. 26, 2019, pp. 1-5 [All references previously cited.].

Examination Report in European Application No. 19171976.4 dated Jun. 19, 2019, pp. 1-8.

Examination Report in GB Application No. 1607394.2 dated Jul. 5, 2019, pp. 1-4.

\* cited by examiner

SYSTEM AND METHOD FOR VALIDATING PHYSICAL-ITEM SECURITY

FIELD OF THE INVENTION

The present invention relates to validating physical-item security and, more particularly, to validating cargo security, for example in the airline industry.

BACKGROUND

Cargo security procedures are used, for example in the airline industry, in an effort to guard against the inclusion of dangerous articles, such as explosives and other types of weapons. Notwithstanding, it is believed that further improvements may be beneficial, for example improvements that seek to ensure that a safe cargo item is not replaced with a dangerous cargo item and/or supplemented with a dangerous article.

Whereas systems and methods for validating physical-item security are known, there is a desire for such systems and methods that provide a new balance of properties.

SUMMARY

Accordingly, an aspect of this disclosure is the provision of a method of validating physical-item security, comprising: obtaining, by first computerized data acquisition equipment in a first area, data indicative of a measurement of a characteristic of a physical item in the first area, the characteristic being selected from the group consisting of volume of the physical item, at least one dimension of the physical item, weight of the physical item, and density of the physical item; obtaining, by second computerized data acquisition equipment in a second area, data indicative of a measurement of the characteristic of a physical item in the second area, and data indicative of a unique identifier of an identifying article with the physical item in the second area; retrieving, by at least one processor, using at least the unique identifier, the measurement of the characteristic of the physical item in the first area; determining, by the at least one processor, a difference between the measurement of the characteristic of the physical item in the first area and the measurement of the characteristic of the physical item in the second area; and providing, by the at least one processor, if indicated by comparison between the difference and predetermined criteria, an indication of invalid security for the physical item in the second area.

In an exemplary implementation, the physical item in the first area and the physical item in the second area are the same physical item.

In another exemplary implementation, each of the first computerized data acquisition equipment and the second computerized data acquisition equipment comprises at least one device selected from the group consisting of a weighing scale and an optical dimensioning system; the identifying article comprises an optical, machine-readable, representation of data; and the method comprises obtaining the unique identifier of the identifying article, comprising decoding the optical, machine-readable, representation of data.

In yet another exemplary implementation, the method comprises loading physical items, using a loader machine, into a cargo hold of an aircraft; and automatically ceasing at least one operation of the loader machine in response to the indication of invalid security for the physical item in the second area.

In a further another exemplary implementation, the method comprises generating an alarm in response to the indication of invalid security for the physical item in the second area.

In accordance with another exemplary implementation, the first area is a check-in area, and the second area comprises a security checkpoint. The first area can include a check-in counter, and the security checkpoint can be adjacent an aircraft. The method can include not loading the physical item in the second area into the aircraft in response to the indication of invalid security.

In accordance with yet another exemplary implementation, the method comprises there not being an indication of invalid security for the physical item in the second area, and loading the physical item in the second area into a vehicle. The physical item in the second area can be a first physical item. The method can comprise performing the method for a second physical item, and not loading the second physical item into the vehicle in response to an indication of invalid security for the second physical item.

As an example, the method can comprise associating together, in a computer database, the unique identifier and data indicative of the measurement of the characteristic of the physical item in the first area; and retrieving, from the computer database, using the unique identifier, the data indicative of the measurement of the characteristic of the physical item in the first area.

As another example, the method can comprise the identifying article being secured to the physical in the first area, wherein the identifying article is selected from the group consisting of: an RFID tag, and a tag comprising an optical, machine-readable, representation of data.

Another aspect of this disclosure is the provision of a method of validating physical item security, comprising: having access to a computer database comprising data indicative of first subject matter, the first subject matter being indicative of at least one characteristic of a physical item in a first area; obtaining, by computerized data acquisition equipment in a second area, data indicative of second subject matter, the second subject matter being indicative of at least one characteristic of a physical item in a second area, and data indicative of a unique identifier of the physical item in a second area; retrieving, by at least one processor, from the computer database, using the unique identifier, the data indicative of the first subject matter; determining, by the at least one processor, a difference between the first subject matter and the second subject matter; and providing, by the at least one processor, if indicated by comparison between the difference and predetermined criteria, an indication of invalid security for the physical item in the second area.

In an exemplary implementation, both the at least one characteristic of the physical item in the first area and the at least one characteristic of the physical item in the second area are selected from the group consisting of volume, at least one dimension, weight, and density.

In another exemplary implementation, the computerized data acquisition equipment comprises an optical dimensioning device; and the method comprises obtaining, by the optical dimensioning device in the second area, data indicative of at least one dimension of the physical item.

In yet another exemplary implementation, the method comprises associating, in the computer database, the unique identifier with the data indicative of the first subject matter.

A further aspect of this disclosure is the provision of a system for validating physical item security, comprising: a computer configured to communicate with a computer database comprising data indicative of first subject matter, the first subject matter being indicative of at least one characteristic of a physical item in a first area; and computerized data acquisition equipment configured to obtain data indicative of second subject matter, the second subject matter being indicative of at least one characteristic of a physical item in a second area, and obtain data indicative of a unique identifier of an identifying article with the physical item in the second area; wherein the computer is configured to retrieve, from the computer database, using the unique identifier, the data indicative of the first subject matter, determine a difference between the first subject matter and the second subject matter, and provide, if indicated by a comparison between the difference and predetermined criteria, an indication of invalid physical item security.

In an exemplary implementation, the system comprises a loader machine configured to load physical items into a vehicle, wherein at least the computer and the loader machine are cooperatively configured to automatically cease at least one operation of the loader machine in response to the indication of invalid physical item security.

In another exemplary implementation, the computerized data acquisition equipment comprises at least one of a weighing scale, a dimensioning system, and a data reader configured to capture and decode machine-readable, representations of data.

In yet another exemplary, the system comprises computerized data acquisition equipment configured to be positioned in a first area to obtain data indicative of the first subject matter from the physical item in the first area.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings discussed below are schematic, and features depicted therein may not be drawn to scale. The drawings are provided as examples. The present invention may, however, be embodied in many different forms and should not be construed as limited to the examples depicted in the drawings.

DETAILED DESCRIPTION

Examples of embodiments are disclosed in the following. The present invention may, however, be embodied in many different forms and should not be construed as limited to the embodiments set forth herein.

Figure 1:
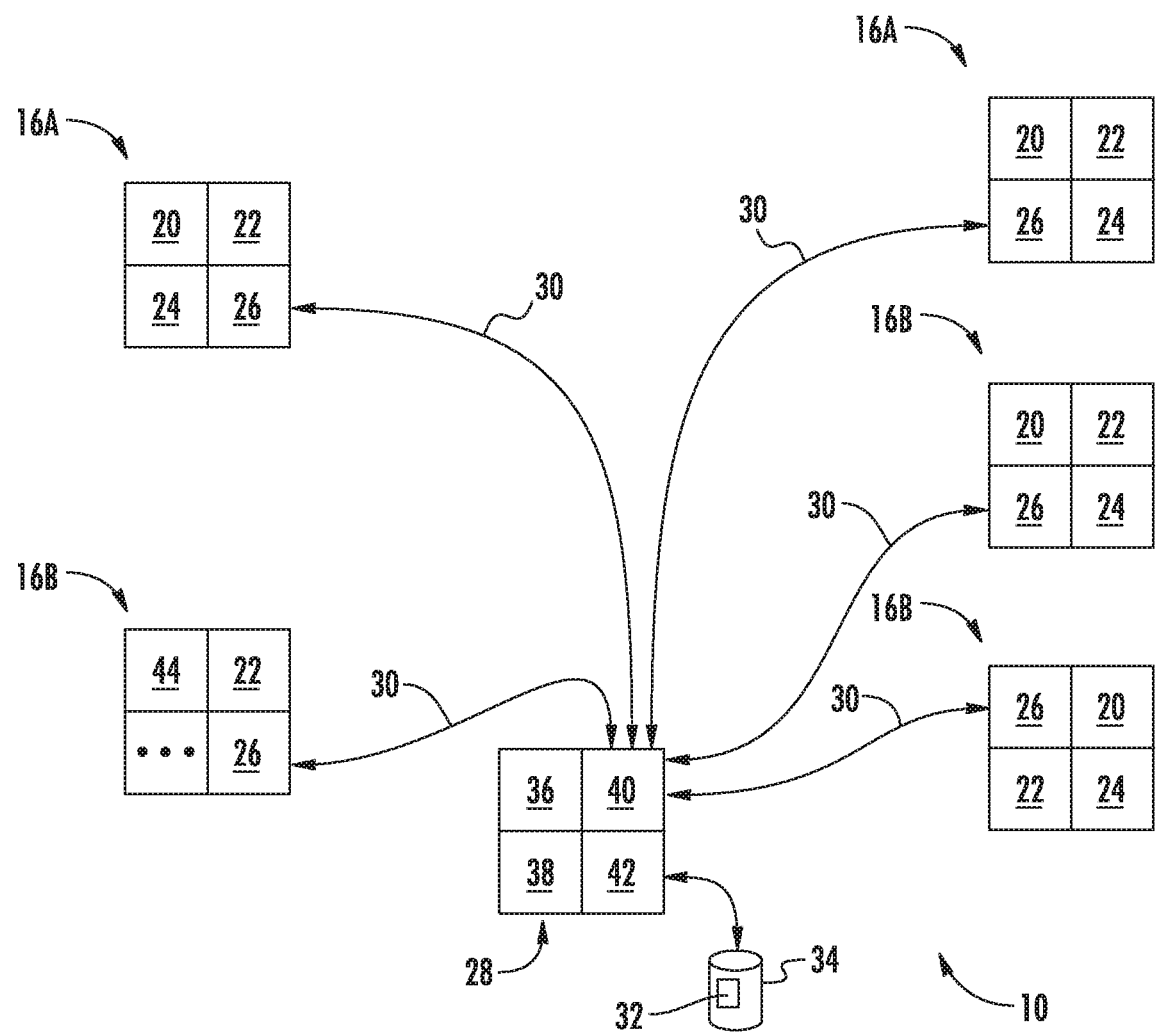
FIG. 1 is a block diagram depicting a system substantially in isolation, wherein the system is capable of being used for validating physical-item security in a transport network including pathways along which the physical items are transported, in accordance with an embodiment of this disclosure.

FIG. 1 schematically depicts features of a system 10 for validating security of physical items (e.g., articles, packages, baggage, and/or cargo), in accordance with an embodiment of this disclosure. The system 10 can be configured for use in validating physical-item security in one or more transport networks that include pathways along which the physical items are transported. In the embodiment depicted in the drawings, the physical items being screened for security purposes are cargo or baggage 12 (FIGS. 2-4) at an airport facility, and the system 10 is configured for use in association with an airport transport network that delivers baggage to aircraft 14 (FIG. 4), as will be discussed in greater detail below. Alternatively, the system 10 can be configured for use in, and can be incorporated into, a wide variety of different settings.

In the example depicted in FIG. 1, the system 10 includes one or more first, initial, upstream, or check-in stations 16A; and one or more second, subsequent, downstream, or checkpoint stations 16B. The one or more checkpoint stations 16B can be positioned distantly downstream from the one or more check-in stations 16A along respective travel paths of cargo or baggage 12 (FIGS. 2-4) being transported through an airport transport network. As will be discussed in greater detail below, each piece of baggage 12 can have fixedly associated therewith at least one unique identifier 18 (FIGS. 2-4), wherein the unique identifiers are typically encoded.

As schematically depicted in FIG. 1, each of the stations 16A, 16B can include computerized data acquisition equipment 20, 22, 24 respectively for reading the encoded unique identifiers 18 (FIGS. 2-4) of the baggage 12 (FIGS. 2-4), and obtaining measurements of one or more physical characteristics (e.g., weight and/or dimensions) of the baggage. For each piece of baggage 12, measurements of one or more of its physical characteristics can be obtained at different stations 16A, 16B, and its encoded unique identifier 18 can be used to facilitate comparison between those measurements for security purposes, as will be discussed in greater detail below.

Figure 2:
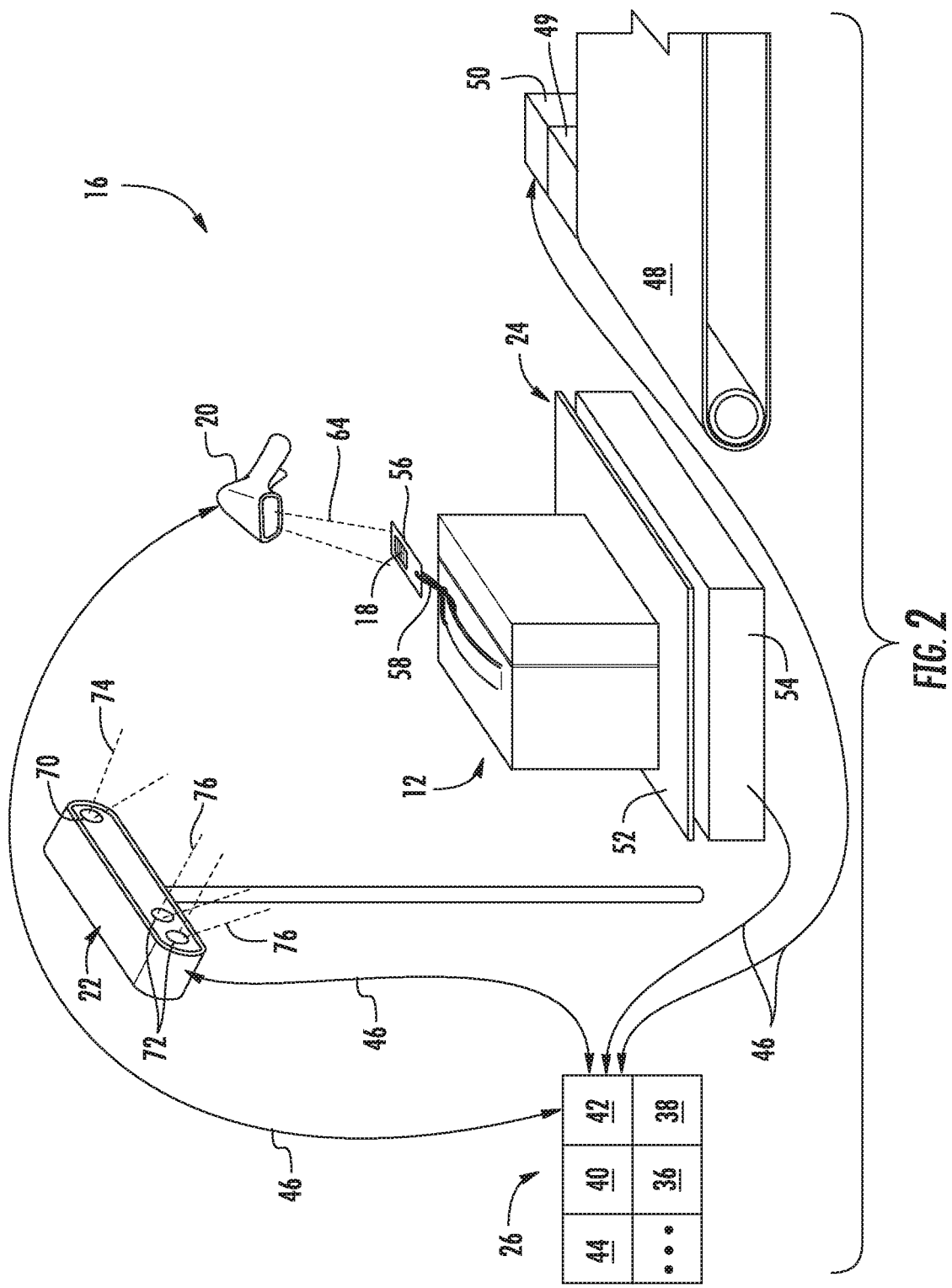
FIG. 2 depicts a representative station of the system of FIG. 1 in association with a piece of baggage or cargo being introduced into an airport transport network that includes a conveyor, in accordance with an embodiment of this disclosure.

As an example, FIG. 2 schematically depicts features of a station 16 that is representative of each of the check-in and checkpoint stations 16A, 16B of the system 10 (FIG. 1). Referring to FIGS. 1 and 2, the data acquisition equipment 20, 22, 24 can include a data reader 20 (e.g., an optical indicia reader and/or RFID reader for reading the encoded unique identifiers 18), a 3D camera assembly 22 for use in dimensioning the baggage 12, and/or a weighing scale 24 for weighing the baggage. Each piece of the data acquisition equipment 20, 22, 24 can include a computer (e.g., processor and memory) and/or the data acquisition equipment 20, 22, 24 can be operatively associated with at least one computer 26 at each station 16A, 16B. Typically there is at least one computer 26 at each station 16A, 16B, although a variety of differently positioned and configured computer devices and/or distributed computing systems are within the scope of this disclosure.

Referring to FIG. 1, the one or more computers 26 at the stations 16A, 16B can be referred to as remote or client computers 26 that communicate with at least one central or server computer 28 by way of one or more communication paths 30. The communication paths 30 can be at least partially provided by one or more communication networks (e.g., local and/or wide area network(s), and/or any other suitable communication path(s)).

With continued reference to FIG. 1, the server computer 28 can include and/or be in communication with at least one computer database of information 32 that can be stored on at least one computer data storage device 34. The database information 32 and/or storage 34 can be distributed in any suitable manner, and is typically subjected to appropriate cybersecurity and computer security measures. The server computer 28 can be located at one of the stations 16A, 16B, one or more of the client computers 26 can serve as the server computer, and/or the components of the system 10 can be distributed in any other suitable manner, and they are typically subjected to appropriate cybersecurity and computer security measures.

In the examples schematically depicted in FIGS. 1 and 2, each of the client and server computers 26, 28 can include one or more of each of a central processing unit or processor 36, computer hardware integrated circuits or memory 38, network interface 40, peripheral or equipment interface 42, user interface 44, and/or any other suitable features. At least partially reiterating from above, in the example of FIG. 2 the data acquisition equipment 20, 22, 24 can be an optical data reader 20, a 3D camera assembly 22, and a weight scale 24 respectively configured to communicate with the client computer equipment interface(s) 42 by way of one or more communication paths 46. The communication paths 46 can be any suitable communication paths, for example they can be wired or wireless (e.g., BLUETOOTH®).

Referring to FIGS. 1 and 2, the user interfaces 44 are configured to allow a user to enter commands and information into the associated computer, and to allow the computer to output information to the user. For example, the input-type user interfaces 44 can include a keyboard, a cursor control device (e.g., a mouse), a microphone, touch functionality (e.g., capacitive or other sensors that are configured to detect physical contact), and/or any other suitable devices. As additional examples, the output-type user interfaces 44 can include a display device (e.g., a monitor or projector), speakers, a printer and/or any other suitable devices.

FIG. 2 depicts the representative station 16 with a piece of baggage 12 that is subject to security screening in association an airport transport network, wherein the transport network includes transportation equipment such as a conveyor 48. The conveying surface of the conveyor 48 can be driven by a motor 49 controlled by a controller 50 (e.g., at least one solenoid-operated switch, computer, programmable logic controller and/or other suitable device). The controller 50 can be in communication with the respective client computer equipment interface 42 by way of a respective one of the above-mentioned communication paths 46. The conveyor 48 can be supplemented with and/or replaced by any other suitable transportation equipment (e.g., for transporting baggage 12).

In the example of FIG. 2, the weighing scale 24 can include a platform 52 that is movably supported by a housing 54 containing a strain gauge and other electrical features configured to output a signal indicative of the weight of the baggage item 12 on the platform. The weighing scale 24 can be any suitable device for measuring weight and providing an indication of the weight.

As depicted in FIG. 2, for each baggage item 12 (also see FIGS. 3 and 4), its encoded unique identifier 18 can be, or can be part of, an identifying article such as a tag 56 that is fixedly attached to the baggage item 12. The tag 56 can include a strap 58 that extends from a panel or main portion of the tag. The strap 58 can be fixedly formed into a loop that extends around a handle or other suitable feature of the baggage item 12 and/or the tag 56 can be attached in any suitable manner. The tag 56 can include indicia, a radio frequency identification (RFID) tag, and/or any other suitable feature configured to provide the encoded unique identifier for the piece of baggage 12.

Regarding the option of the encoded unique identifiers 18 being in the form of indicia, the term "indicia" is intended to refer broadly to various types of machine-readable indicia, including barcodes (e.g., QR codes, matrix codes, 1D codes, and 2D codes), characters, etc. For example, FIG. 2 schematically depicts the coded unique identifier 18 as being machine-readable indicia that is part of a tag 56 fixedly attached to the piece of baggage 12, wherein the machine-readable indicia can be in the form of a barcode on the tag 56. Alternatively, the encoded unique identifier 18 can be part of an identifying article such as a label fixedly connected to the baggage item 12 and/or an can be provided by an identifying article such as an RFID tag fixedly connected to the baggage item. When the encoded unique identifier 18 is provided by machine-readable indicia, the data reader 20 can be an optical data reader configured to read coded data from the machine-readable indicia. As another example, when the encoded unique identifier 18 is provided by an RFID tag, the data reader 20 can be an RFID tag reader.

In the example of FIG. 2, the data reader 20 is configured to optically read the encoded unique identifier 18. The data reader 20 may embrace various kinds of devices used to read indicia, such as handheld barcode scanners, fixed-position omni-directional barcode scanners, pen-type readers, laser scanners, CCD readers, imaging scanners, and mobile devices like smartphones that are equipped to read indicia, and similar devices. In the example depicted in FIG. 2, the data reader 20 acquires information about the encoded unique identifier 18 within the data reader's field of view 64. The encoded unique identifier 18 of the baggage item 12 on the scale platform 52 can be in the data reader's field of view 64. Whereas the encoded unique identifier 18 of the baggage item 12 may be in the field of view 64 of the data reader 20 while the baggage item is on the scale platform 52, the indicia of the baggage item may be read while the baggage item is in any other suitable location. For example, the weight scale 24 may be omitted or configured differently than depicted in the drawings.

Optical information or signals reflected by the encoded unique identifier 18 and obtained by the data reader 20 can be provided as digital data to a computer processor that is within the data reader. The computer processor of the data reader 20 is typically configured by software to process the digital data and at least partially determine the unique identifier from the encoded unique identifier 18. The information encoded by the encoded unique identifier 18 typically includes the unique identifier of the associated baggage item 12. In some instances, the data reader 20 comprises a laser scanning subsystem that sweeps a light beam (e.g., a laser beam) across the field of view 64, and then receives the optical signals that reflect or scatter off the encoded unique identifier 18. Typically, the optical signal is received using a photoreceptor (e.g., photodiode), and is converted into an electrical signal (e.g., image data). In other instances, the data reader 20 comprises an imaging subsystem that captures digital images within the data reader's field of view 64. The digital images are typically processed through the use of image-processing software (e.g. barcode and/or optical character recognition (OCR) decoding technology), which can both identify the presence of encoded unique identifier 18 in the digital image and decode the encoded unique identifier.

In the Example of FIG. 2, the representative station 16 includes an optical dimensioner. The optical dimensioner can comprise the camera assembly 22 and associated client computer processor 36 (e.g., the processor executing software) that are cooperatively configured to use 3D depth sensing technology to measure dimensions of the baggage item 12 on the scale platform 52. The camera assembly 22 can include an elongate housing having opposite ends, a pattern projector 70 mounted in the housing at a position proximate one of the ends, and one or more cameras 72 mounted in the housing at positions proximate the other end of the housing. The pattern projector 70 can be configured to use structured infrared light to create a laser pattern 74 that is simultaneously projected onto each of several surfaces of the baggage item 12 and the upper surface of the scale platform 52. A portion of the projected pattern 74 and portions of fields of view 76 of the cameras 72 are schematically depicted in FIG. 2. At least one of the cameras 72 can be an infrared camera that captures one or more images of the infrared pattern 74 projected onto the several surfaces of the baggage item 12 and the upper surface of the scale platform 52.

The one or more images captured by the at least one camera 72 can comprise a 3D image, range image and/or any other suitable type of image including features from which 3D information can be derived (e.g., stereo imaging, light sheet, time of flight, or any other suitable technique can be used to obtain the images). Under control of the associated client computer processor 36 and/or any other suitable processor (e.g., at least one processor executing software), measured dimensions (e.g., length, height, and/or width) of the baggage item 12 on the weight scale 24 can be determined based upon the one or more captured images. For example, the client computer processor 36 can, responsive to the determination of the dimensions, output one or more of the dimensions and/or other related values (e.g., a value calculated by the processor using the dimensions, such as volume of the baggage item 12). Suitable optical dimensioning systems are available from Honeywell International Inc. (e.g., AUTOCUBE™).

Whereas the top surface of the scale platform 52 and the baggage item 12 thereon can be in the path of the pattern 74 and in the camera fields of view 64, the dimensions of the baggage item may be determined while the baggage item is in any other suitable location. For example, the weight scale 24 may be omitted.

Figure 3:
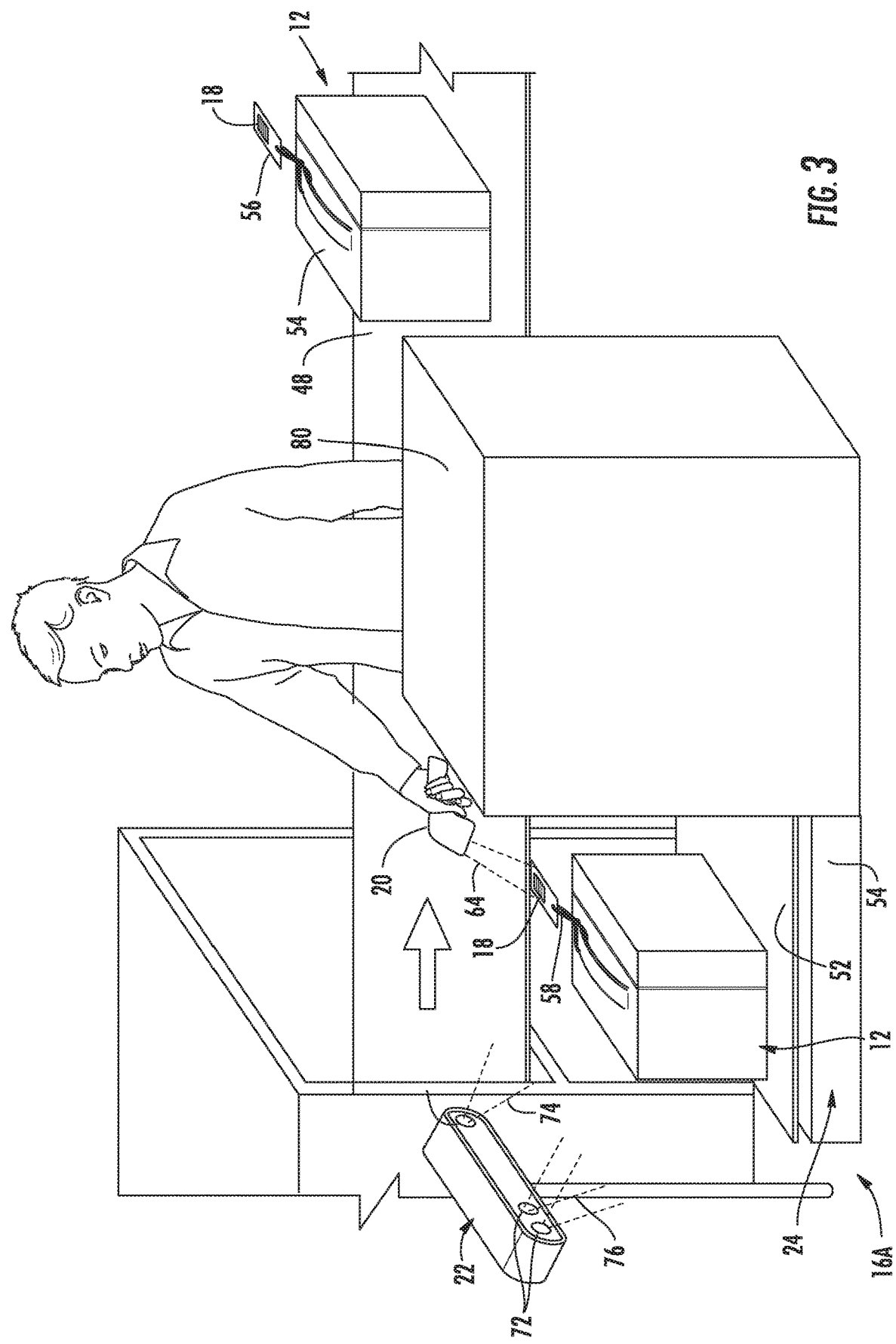
FIG. 3 depicts a check-in station of FIG. 1 in association with baggage, a check-in counter, a user, and an upstream conveyor, in accordance with an embodiment of this disclosure.

FIG. 3 depicts an example of a representative check-in station 16A configured to serve as an area (e.g., an upstream, initial or first area) at which baggage items 12 are serially introduced into and checked into and an airport baggage transport network. Each check-in station 16A can include all of the features discussed above for the representative station 16 (FIG. 2). FIG. 3 depicts the check-in station 16A in association with a check-in counter 80 and an upstream motorized conveyor 48 of the airport baggage transport network. The upstream conveyor 48 can be supplemented with and/or replaced by any other suitable transportation equipment (e.g., for transporting baggage 12). At any appropriate time that baggage 12 is within the airport baggage transport network (e.g., at or proximate the check-in station 16A), the baggage may be subjected to a screening process by authorized security officers, for example in an effort to guard against the inclusion of dangerous articles, such as explosives and other types of weapons.

At each check-in station 16A, one or more authorized personnel (e.g., at least one authorized personnel behind the counter 80) can be responsible for ensuring that each piece of baggage 12 has attached thereto, or otherwise fixedly associated therewith, a respective encoded unique identifier 18 prior to the baggage being released into the airport baggage transport network. For security purposes for each piece of baggage 12, it is typically intended that the respective encoded unique identifier 18 associated with the piece of baggage remain fixedly connected to the piece of baggage throughout the period of time that the piece of baggage is within the airport baggage transport network(s) and upon aircraft 14 (FIG. 4).

In the embodiment depicted in the drawings, for each baggage item 12 being introduced to the airport transport network, at least some of the computerized data acquisition equipment 20, 22, 24 of the check-in station 16A is typically used by at least one authorized personnel to identify (e.g., decode) the encoded unique identifier 18 of the baggage item and determine subject matter indicative of at least one characteristic of a baggage item (e.g., upstream or check-in characteristic(s)). Using the data reader 20 at the check-in station 16A, the unique identifier can be obtained from the encoded unique identifier 18 securely associated with the baggage item 12. Using the optical dimensioner (e.g., camera assembly 22) and/or weight scale 24 at the check-in station 16A, the upstream or check-in characteristic(s) of the baggage item 12 can be obtained. Accordingly, the upstream or check-in characteristic(s) of the baggage item 12 can be the volume, dimension(s), weight, and/or density of the baggage item. Numerous other, different baggage items 12 can be similarly check into and introduced into the transport network by way of respective ones of the check-in stations 16B. For each of the baggage items 12, the unique identifier and check-in characteristic of the baggage item can be uploaded from the check-in station 16A and be associated together in a respective record of the computer database 32 (FIG. 1).

At least one of the cameras 72 of the camera assembly 22, or another camera of the representative station 16 or check-in station 16A, can be a conventional camera for obtaining a conventional color photograph of each baggage item 12. Accordingly, the upstream or check-in characteristics of each baggage item 12 can further include a conventional color photograph of the baggage item 12.

Figure 4:
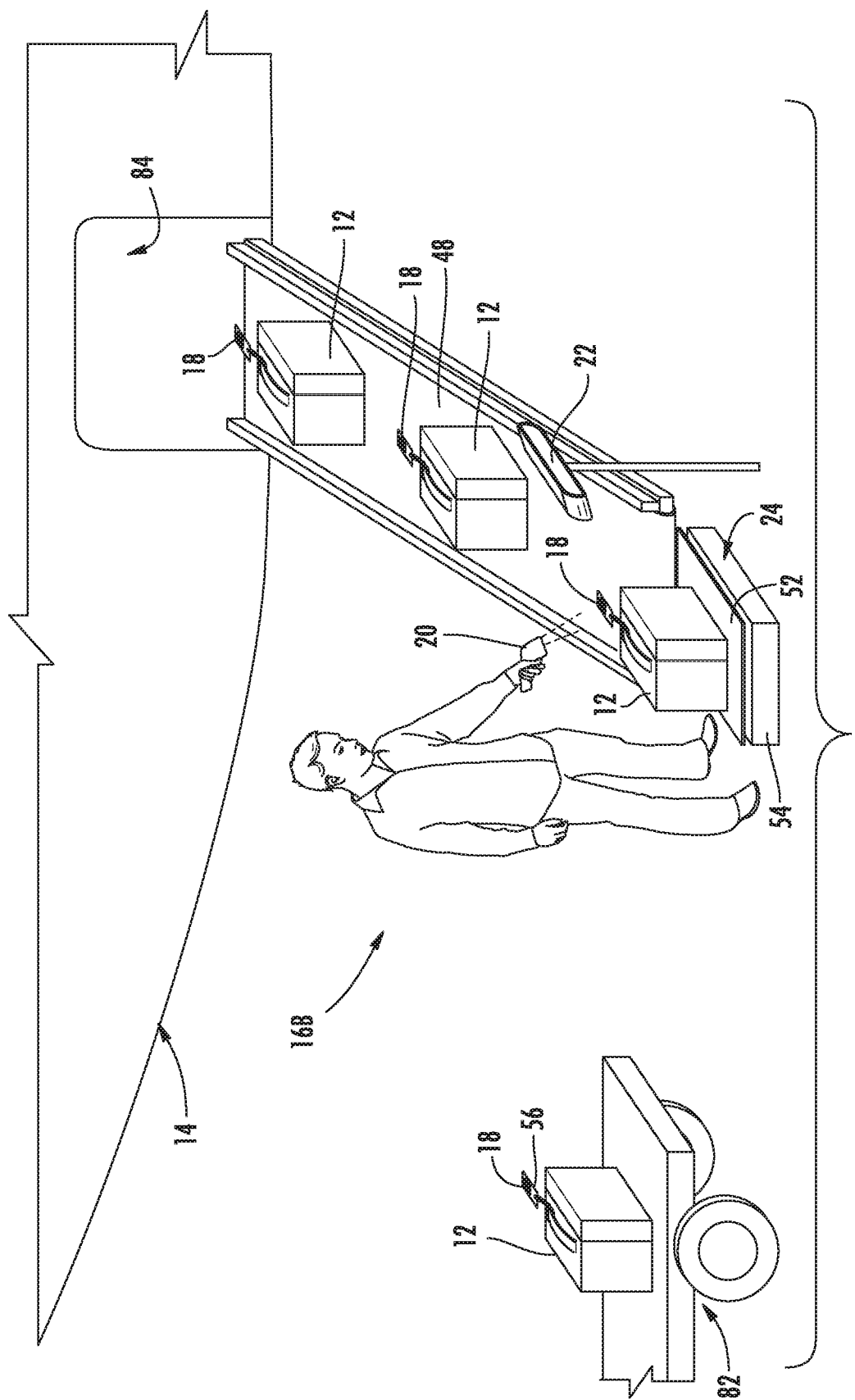
FIG. 4 depicts a checkpoint station of FIG. 1 in association with baggage, a trailer, a user, and a downstream conveyor, wherein the downstream conveyor is depicted as being used to load the baggage into a cargo hold of an aircraft, in accordance with an embodiment of this disclosure.

FIG. 4 depicts an example of a representative checkpoint station 16B configured to serve as an area where baggage items 12 are serially validated for security purposes within the airport transport network, and then loaded into an aircraft 14. Each checkpoint station 16B can include all of the features discussed above for the representative station 16 (FIG. 2). FIG. 4 depicts the checkpoint station 16B in association with both a vehicle 82 of the transport network and a downstream motorized conveyor 48 of the transport network. The vehicle 82 can be configured for transporting baggage 12. The downstream conveyor 48 can be part of a belt loader machine, belt loader vehicle, or the like. As depicted in FIG. 4, the downstream conveyor 48 is loading the baggage 12 into a cargo hold or other storage compartment of an aircraft 14. The downstream conveyor 48 and vehicle 82 can be supplemented with and/or replaced by any other suitable transportation equipment.

For each baggage item 12 arriving at a checkpoint station 16B, at least some of the computerized data acquisition equipment 20, 22, 24 of the checkpoint station is typically used by one or more authorized personnel to identify both the unique identifier of the baggage item 12 and subject matter indicative of at least one characteristic of baggage item at the checkpoint station (e.g., downstream or checkpoint characteristic(s)). Using the data reader 20 at the checkpoint station 16B, the unique identifier can be obtained from the encoded unique identifier 18 securely associated with the baggage item 12. Using the optical dimensioner (e.g., camera assembly 22) and/or weight scale 24 at the checkpoint station 16B, the downstream or checkpoint characteristic(s) of the baggage item 12 can be obtained. Accordingly, the downstream or checkpoint characteristic(s) of the baggage item 12 can be the volume, dimension(s), weight, and/or density of the baggage item. Optionally, the unique identifier and checkpoint characteristic of the baggage item 12 can be uploaded from the checkpoint station 16B and be associated together in a record of the computer database 32 (FIG. 1).

In accordance with a method of this disclosure, the above-discussed checkpoint characteristic(s) of a baggage or physical item identified by a unique identifier can be compared to the above-discussed check-in characteristic(s) assigned to the same unique identifier, and action can be taken depending upon, or in response to, the results of the comparison. For example, checkpoint characteristic(s) of a baggage item 12 identified by a unique identifier can be compared to check-in characteristic(s) associated with the same unique identifier for security purposes, in a manner that seeks to ensure that a safe piece of baggage is not replaced with a dangerous piece of baggage and/or supplemented with dangerous article(s). For example, it is believed that a first baggage item 12 may be replaced by a second baggage item by removing the tag 56 from the first baggage item and fixedly attaching that same tag to the second baggage item, or otherwise moving the encoded unique identifier 18 of the first baggage item to the second baggage item, or the like.

As a more specific example, for a baggage item 12 at a checkpoint station 16B, the associated client computer processor 36 (FIG. 2) and/or any other suitable processor (e.g., at least one processor executing software) can: obtain, based upon measurement(s) taken at the checkpoint station, the checkpoint characteristic(s) of the baggage item; use the unique identifier decoded from the encoded unique identifier 18 of the baggage item at the checkpoint station to retrieve the check-in characteristic(s) associated with the unique identifier, for example from the computer database 32 (FIG. 1); compare the checkpoint characteristic(s) to the check-in characteristic(s); and provide an indication of invalid security for the baggage item if indicated by a comparison between predetermined criteria (e.g., threshold(s)) and any difference between the checkpoint and check-in characteristics.

As an even more specific example, for a baggage item 12 identified by a unique identifier at a checkpoint station 16B, if the associated client computer processor 36 and/or any other suitable processor determines that at least one dimension, weight, volume, and/or density of the baggage item identified by the same unique identifier at a check-in station 16A differs from the corresponding characteristic of the baggage item at the check-point station 16B by more than a predetermined percentage or threshold, then the at least one computer processor can provide an indication of invalid security for the baggage item. A detected increase in one or more of the characteristics of the baggage item 12 may be indicative of one or more articles having been added to (e.g., inserted into) the baggage item, or the baggage item having been replaced with another baggage item (e.g., by moving the tag 56 between the baggage items). A detected decrease in one or more of the characteristics of the baggage item 12 may be indicative of one or more articles having been removed from the baggage item, or the baggage item having been replaced with another baggage item (e.g., by moving the tag 56 between the baggage items).

As an example, some baggage items 12 may be of the soft-sided type (e.g., duffle bags) that may deform in shape while traveling between the respective check-in and checkpoint stations 16A, 16B. Accordingly, for this example it is believed that if the client computer processor 36 and/or any other suitable processor determines that the volume of a baggage item 12 at a check-in station 16A differs from the volume of the baggage item identified by the same unique identifier at a check-point station 16B by more than a predetermined percentage, for example about 5 percent, about 10 percent, or about 15 percent, then the at least one computer processor would provide an indication of invalid security for the baggage item.

As another example, if the client computer processor 36 (FIG. 2) and/or any other suitable processor determines that the measured weight of a baggage item 12 at a check-in station 16A differs from the measured weight of the baggage item identified by the same unique identifier at a check-point station 16B by more than a predetermined percentage, then the at least one computer processor can provide an indication of invalid security for the baggage item.

Depending upon the accuracy and precision of the weight scales 24, if the client computer processor 36 and/or any other suitable processor determines that the measured weight of a baggage item 12 at a check-in station 16A varies from the measured weight of the baggage item identified by the same unique identifier at a check-point station 16B by more than about 0.5 pounds and/or about 5 percent (or any other suitable percentage), then the at least one computer processor can provide an indication of invalid security for the baggage item. Similarly, depending upon the accuracy and precision of the optical dimensioner (e.g., camera assembly 22), if the client computer processor 36 and/or any other suitable processor determines that at least one measured dimension, determined volume, and/or density of a baggage item 12 at a check-in station 16A differs from the corresponding characteristic of the baggage item identified by the same unique identifier at a check-point station 16B by more than a predetermined percentage (e.g., about 5 percent or any other suitable percentage), then the at least one computer processor can provide an indication of invalid security for the baggage item.

It is believed that the predetermined criteria (e.g., threshold(s)) for a client computer processor 36 and/or any other suitable processor to provide an indication of invalid security may depend upon the precision and accuracy of the weight scales 24 and optical dimensioner (e.g., camera assembly 22), as well as the types, sizes and weights of the physical items being screened for security purposes. It is believed that those of ordinary skill in the art will readily understand that, in different implementations of the features of this disclosure, different engineering tolerances, precision, and/or accuracy may be applicable.

At least partially reiterating from above, for a baggage item 12 at a checkpoint station 16B, the associated client computer processor 36 (FIG. 2) and/or any other suitable processor (e.g., at least one processor executing software) can provide an indication of invalid security for the baggage item (e.g., identify the baggage item as being a security risk) in response to there being a predetermined difference between the checkpoint and check-in characteristic(s) for the baggage item(s) identified by the same unique identifier. The client computer processor 36 and/or any other suitable processor can identify the baggage item 12 as being a security risk by providing an indication (e.g., warning, alarm (e.g., audible and/or visual), and/or other suitable notice) to authorized personnel at the checkpoint station and/or by providing at least one stop signal, or the like, that disrupts operation of a respective component of the transport network that is located at the checkpoint station. For example, the indication of the security risk can by provided way of the output-type user interfaces 44 (FIG. 2) at the checkpoint station. The warning, alarm and/or or other suitable notice provided to one or more of the output-type user interfaces 44 can identify the baggage item 12 flagged for invalid security by its location (e.g., on the scale 24), by its unique identifier (e.g., encoded unique identifier 18), and/or by providing a picture (e.g., a conventional color photograph) of the baggage item 12. Any baggage item 12 flagged for invalid security would typically be subjected to screening procedures by authorized personnel before being allowed to further progress in the transport network.

As another example, the stop signal originated by the client computer processor 36 and/or any other suitable processor in response to identification of a security risk can be provided to a motor controller 50 (FIG. 2) to stop operation of a conveyor 48 (FIG. 4) located at the checkpoint station 16B. The stop signal and/or the resulting interruption in operation of the conveyor 48 may remain present until authorized personnel provide, by way of one or more of the input-type user interfaces 44 (FIG. 2), an indication that the baggage item 12 identified as a security risk has been properly processed (e.g., pulled aside for security screening), or the like. More generally, the at least one computer processor and respective components of the system 10 and transport network can be cooperatively configured to automatically cease at least one operation of the transport network in response to the indication of invalid physical item security.

At least partially reiterating from above, the system 10 can use at least automated dimensioning (e.g., 3D camera assembly 22) to improve security in cargo delivery operations, such as airline baggage 12, by keeping a database 32 (FIG. 1) of baggage dimensions and optionally also baggage weights created at check-in, and re-measuring dimensions and/or weight at least once more prior to loading the cargo on an aircraft 14 (FIG. 14), other vehicle, or the like. For each piece of cargo, any discrepancies in its dimensions and/or weight that exceed a threshold can provide an indication of a security risk and result in initiation of investigation by authorized personnel. In addition to improved security, the dimensional and/or weight information can be used to optimize loading efficiency and to predict loading times and capacity.

The database 32 (FIG. 1) can include cargo tracking information for each piece of baggage 12, for example including the unique identifier (e.g., from encoded unique identifier 18), passenger identifier, dimensional information (e.g., each of the length, width and height), and optionally also the weight of the piece of baggage. For each piece of baggage 12, the database 32 can be analyzed by one or more of the computer processors 36 (FIGS. 1 and 2) (e.g., at least one computer processor executing software) to determine whether there has been a change to the weight and/or dimensions prior to loading the baggage onto an aircraft 14 (FIG. 14), other vehicle, or the like.

Whereas the system 10 is often described in the foregoing in the context of baggage 12 and an airport transportation network, the system 10 is configured to be capable of being used in a wide variety of other contexts, for example in the context of any suitable transportation networks, supply chains systems, transportation services, delivery services, and/or the like for any suitable types of physical items. Moreover, in the foregoing, whereas specific terms have been used for ease of understand, a variety of different terms are within the scope of this disclosure. For example, the computerized data acquisition equipment 20, 22, 24 of a check-in station 16A may be referred to as first computerized data acquisition equipment located in a first area for obtaining first measurement(s), first subject matter, and/or other suitable characteristics; and the computerized data acquisition equipment 20, 22, 24 of a checkpoint station 16B may be referred to as second computerized data acquisition equipment located in a second area for obtaining first measurement(s), first subject matter, and/or other suitable characteristics.

* * *

To supplement the present disclosure, this application incorporates entirely by reference the following commonly assigned patents and patent application publications: U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036;

9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140; U.S. Design Pat. No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Patent No. D734,339; U.S. Design Pat. No. D737,321; U.S. Design Patent No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546; International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent Application Publication No. 2014/0270229; U.S. Patent Application Publication No. 2014/0278387; U.S. Patent Application Publication No. 2014/0288933; U.S. Patent Application Publication No. 2014/0297058; U.S. Patent Application Publication No. 2014/0299665; U.S. Patent Application Publication No. 2014/0332590; U.S. Patent Application Publication No. 2014/0351317; U.S. Patent Application Publication No. 2014/0362184; U.S. Patent Application Publication No. 2014/0363015; U.S. Patent Application Publication No. 2014/0369511; U.S. Patent Application Publication No. 2014/0374483; U.S. Patent Application Publication No. 2014/0374485; U.S. Patent Application Publication No. 2015/0001301; U.S. Patent Application Publication No. 2015/0001304; U.S. Patent Application Publication No. 2015/0009338; U.S. Patent Application Publication No. 2015/0014416; U.S. Patent Application Publication No. 2015/0021397; U.S. Patent Application Publication No. 2015/0028104; U.S. Patent Application Publication No. 2015/0029002; U.S. Patent Application Publication No. 2015/0032709; U.S. Patent Application Publication No. 2015/0039309; U.S. Patent Application Publication No. 2015/0039878; U.S. Patent Application Publication No. 2015/0040378; U.S. Patent Application Publication No. 2015/0049347; U.S. Patent Application Publication No. 2015/0051992; U.S. Patent Application Publication No. 2015/0053769; U.S. Patent Application Publication No. 2015/

0062366; U.S. Patent Application Publication No. 2015/0063215; U.S. Patent Application Publication No. 2015/0088522; U.S. Patent Application Publication No. 2015/0096872; U.S. Patent Application Publication No. 2015/0100196; U.S. Patent Application Publication No. 2015/0102109; U.S. Patent Application Publication No. 2015/0115035; U.S. Patent Application Publication No. 2015/0127791; U.S. Patent Application Publication No. 2015/0128116; U.S. Patent Application Publication No. 2015/0133047; U.S. Patent Application Publication No. 2015/0134470; U.S. Patent Application Publication No. 2015/0136851; U.S. Patent Application Publication No. 2015/0142492; U.S. Patent Application Publication No. 2015/0144692; U.S. Patent Application Publication No. 2015/0144698; U.S. Patent Application Publication No. 2015/0149946; U.S. Patent Application Publication No. 2015/0161429; U.S. Patent Application Publication No. 2015/0178523; U.S. Patent Application Publication No. 2015/0178537; U.S. Patent Application Publication No. 2015/0178685; U.S. Patent Application Publication No. 2015/0181109; U.S. Patent Application Publication No. 2015/0199957; U.S. Patent Application Publication No. 2015/0210199; U.S. Patent Application Publication No. 2015/0212565; U.S. Patent Application Publication No. 2015/0213647; U.S. Patent Application Publication No. 2015/0220753; U.S. Patent Application Publication No. 2015/0220901; U.S. Patent Application Publication No. 2015/0227189; U.S. Patent Application Publication No. 2015/0236984; U.S. Patent Application Publication No. 2015/0239348; U.S. Patent Application Publication No. 2015/0242658; U.S. Patent Application Publication No. 2015/0248572; U.S. Patent Application Publication No. 2015/0254485; U.S. Patent Application Publication No. 2015/0261643; U.S. Patent Application Publication No. 2015/0264624; U.S. Patent Application Publication No. 2015/0268971; U.S. Patent Application Publication No. 2015/0269402; U.S. Patent Application Publication No. 2015/0288689; U.S. Patent Application Publication No. 2015/0288896; U.S. Patent Application Publication No. 2015/0310243; U.S. Patent Application Publication No. 2015/0310244; U.S. Patent Application Publication No. 2015/0310389; U.S. Patent Application Publication No. 2015/0312780; U.S. Patent Application Publication No. 2015/0327012; U.S. Patent Application Publication No. 2016/0014251; U.S. Patent Application Publication No. 2016/0025697; U.S. Patent Application Publication No. 2016/0026838; U.S. Patent Application Publication No. 2016/0026839; U.S. Patent Application Publication No. 2016/0040982; U.S. Patent Application Publication No. 2016/0042241; U.S. Patent Application Publication No. 2016/0057230; U.S. Patent Application Publication No. 2016/0062473; U.S. Patent Application Publication No. 2016/0070944; U.S. Patent Application Publication No. 2016/0092805; U.S. Patent Application Publication No. 2016/0101936; U.S. Patent Application Publication No. 2016/0104019; U.S. Patent Application Publication No. 2016/0104274; U.S. Patent Application Publication No. 2016/0109219; U.S. Patent Application Publication No. 2016/0109220; U.S. Patent Application Publication No. 2016/0109224; U.S. Patent Application Publication No. 2016/0112631; U.S. Patent Application Publication No. 2016/0112643; U.S. Patent Application Publication No. 2016/0117627; U.S. Patent Application Publication No. 2016/0124516; U.S. Patent Application Publication No. 2016/0125217; U.S. Patent Application Publication No. 2016/0125342; U.S. Patent Application Publication No. 2016/0125873; U.S. Patent Application Publication No. 2016/0133253; U.S. Patent Application Publication No. 2016/0171597; U.S. Patent Application Publication No. 2016/0171666; U.S. Patent Application Publication No. 2016/0171720; U.S. Patent Application Publication No. 2016/0171775; U.S. Patent Application Publication No. 2016/0171777; U.S. Patent Application Publication No. 2016/0174674; U.S. Patent Application Publication No. 2016/0178479; U.S. Patent Application Publication No. 2016/0178685; U.S. Patent Application Publication No. 2016/0178707; U.S. Patent Application Publication No. 2016/0179132; U.S. Patent Application Publication No. 2016/0179143; U.S. Patent Application Publication No. 2016/0179368; U.S. Patent Application Publication No. 2016/0179378; U.S. Patent Application Publication No. 2016/0180130; U.S. Patent Application Publication No. 2016/0180133; U.S. Patent Application Publication No. 2016/0180136; U.S. Patent Application Publication No. 2016/0180594; U.S. Patent Application Publication No. 2016/0180663; U.S. Patent Application Publication No. 2016/0180678; U.S. Patent Application Publication No. 2016/0180713; U.S. Patent Application Publication No. 2016/0185136; U.S. Patent Application Publication No. 2016/0185291; U.S. Patent Application Publication No. 2016/0186926; U.S. Patent Application Publication No. 2016/0188861; U.S. Patent Application Publication No. 2016/0188939; U.S. Patent Application Publication No. 2016/0188940; U.S. Patent Application Publication No. 2016/0188941; U.S. Patent Application Publication No. 2016/0188942; U.S. Patent Application Publication No. 2016/0188943; U.S. Patent Application Publication No. 2016/0188944; U.S. Patent Application Publication No. 2016/0189076; U.S. Patent Application Publication No. 2016/0189087; U.S. Patent Application Publication No. 2016/0189088; U.S. Patent Application Publication No. 2016/0189092; U.S. Patent Application Publication No. 2016/0189284; U.S. Patent Application Publication No. 2016/0189288; U.S. Patent Application Publication No. 2016/0189366; U.S. Patent Application Publication No. 2016/0189443; U.S. Patent Application Publication No. 2016/0189447; U.S. Patent Application Publication No. 2016/0189489; U.S. Patent Application Publication No. 2016/0192051; U.S. Patent Application Publication No. 2016/0202951; U.S. Patent Application Publication No. 2016/0202958; U.S. Patent Application Publication No. 2016/0202959; U.S. Patent Application Publication No. 2016/0203021; U.S. Patent Application Publication No. 2016/0203429; U.S. Patent Application Publication No. 2016/0203797; U.S. Patent Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/

0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

* * *

In the above description and/or figure, examples of embodiments have been disclosed. The present invention is not limited to such exemplary embodiments. Unless otherwise noted, specific terms have been used in a generic and descriptive sense and not for purposes of limitation. The use of the term "and/or" includes any and all combinations of one or more of the associated listed items.

The invention claimed is:

1. A method of validating physical-item security, the method comprising:
   obtaining, by a first computerized data acquisition equipment in a first area, data indicative of a measurement of a characteristic of a physical item in the first area, the characteristic being selected from the group consisting of a volume of the physical item, at least one dimension of the physical item, a weight of the physical item, and a density of the physical item;
   obtaining, by a second computerized data acquisition equipment in a second area,
      data indicative of a measurement of the characteristic of the physical item in the second area, and
      data indicative of a unique identifier of an identifying article associated with the physical item in the second area, and
   retrieving, by a processor, using at least the unique identifier, the measurement of the characteristic of the physical item in the first area;
   determining, by the processor, a difference between the measurement of the characteristic of the physical item in the first area and the measurement of the characteristic of the physical item in the second area;
   comparing, by the processor, the difference with a predetermined threshold, the predetermined threshold corresponding to a predefined variation in weight of the physical item; and
   in response to the difference in the weight of the physical item being greater than the predetermined threshold, generating by the processor an indication of invalid security for the physical item in the second area.

2. The method according to claim 1, wherein the physical item in the first area and the physical item in the second area are the same physical item.

3. The method according to claim 1, wherein:
   each of the first computerized data acquisition equipment and the second computerized data acquisition equipment comprises at least one device selected from the group consisting of a weighing scale and an optical dimensioning system;
   the identifying article comprises an optical, machine-readable, representation of data; and
   the method comprises obtaining the unique identifier of the identifying article, comprising decoding the optical, machine-readable, representation of data.

4. The method according to claim 1, comprising:
   loading physical items, using a loader machine, into a cargo hold of an aircraft; and
   automatically ceasing at least one operation of the loader machine in response to the indication of invalid security for the physical item in the second area.

5. The method according to claim 1, comprising generating an alarm in response to the indication of invalid security for the physical item in the second area.

6. The method according to claim 1, wherein
   the first area is a check-in area; and
   the second area comprises a security checkpoint.

7. The method according to claim 6, wherein:
   the first area comprises a check-in counter; and
   the security checkpoint is adjacent an aircraft.

8. The method according to claim 7, wherein the method comprises not loading the physical item in the second area into the aircraft in response to the indication of invalid security.

9. The method according to claim 1, comprising:
there not being an indication of invalid security for the physical item in the second area; and
loading the physical item in the second area into a vehicle.

10. The method according to claim 9, wherein the physical item in the second area is a first physical item, and the method comprises:
performing the method for a second physical item; and
not loading the second physical item into the vehicle in response to an indication of invalid security for the second physical item.

11. The method according to claim 1, comprising:
associating together, in a computer database, the unique identifier and data indicative of the measurement of the characteristic of the physical item in the first area; and
retrieving, from the computer database, using the unique identifier, the data indicative of the measurement of the characteristic of the physical item in the first area.

12. The method according to claim 1, comprising the identifying article being secured to the physical in the first area, wherein the identifying article is selected from the group consisting of:
an RFID tag, and
a tag comprising an optical, machine-readable, representation of data.

13. A method of validating physical item security, the method comprising:
having access to a computer database comprising data indicative of first subject matter, the first subject matter being indicative of a volume of a physical item in a first area;
obtaining, by a computerized data acquisition equipment in a second area,
data indicative of second subject matter, the second subject matter being indicative of at least one characteristic of the physical item in a second area, and
data indicative of a unique identifier of the physical item in the second area;
retrieving, by a processor, from the computer database, using the unique identifier, the data indicative of the first subject matter;
determining, by the processor, a difference between the first subject matter and the second subject matter;
comparing, by the processor, the difference with a predetermined threshold, the predetermined threshold corresponds to an predefined variation in the volume of the physical item; and
in response to the difference in volume of the physical item being greater than the predetermined threshold, providing by the processor an indication of invalid security for the physical item in the second area.

14. The method according to claim 13, wherein both the at least one characteristic of the physical item in the first area and the at least one characteristic of the physical item in the second area are selected from the group consisting of volume, at least one dimension, weight, and density.

15. The method according to claim 13, wherein:
the computerized data acquisition equipment comprises an optical dimensioning device; and
the method comprises obtaining, by the optical dimensioning device in the second area, data indicative of at least one dimension of the physical item.

16. The method according to claim 13, comprising associating, in the computer database, the unique identifier with the data indicative of the first subject matter.

17. A system for validating physical item security, the system comprising:
a computer configured to communicate with a computer database comprising data indicative of first subject matter, the first subject matter being indicative of at least one characteristic of a physical item in a first area; and
computerized data acquisition equipment configured to
obtain data indicative of second subject matter, the second subject matter being indicative of at least one characteristic of a physical item in a second area, and
obtain data indicative of a unique identifier of an identifying article with the physical item in the second area;
wherein the computer is configured to
retrieve, from the computer database, using the unique identifier, the data indicative of the first subject matter,
determine a difference between the first subject matter and the second subject matter,
compare, the difference with a predetermined threshold, wherein the predetermined threshold corresponds to an predefined variation in the at least one characteristic of the physical item;
in response to the difference in the at least one characteristic of the physical item being greater than the predetermined threshold, providing an indication of invalid physical item security.

18. The system according to claim 17, comprising a loader machine configured to load physical items into a vehicle, wherein at least the computer and the loader machine are cooperatively configured to automatically cease at least one operation of the loader machine in response to the indication of invalid physical item security.

19. The system according to claim 17, wherein the computerized data acquisition equipment comprises at least one of a weighing scale, a dimensioning system, and a data reader configured to capture and decode machine-readable, representations of data.

20. The system according to claim 17, comprising computerized data acquisition equipment configured to be positioned in a first area to obtain data indicative of the first subject matter from the physical item in the first area.

* * * * *